US011806797B2

(12) United States Patent
Onose et al.

(10) Patent No.: US 11,806,797 B2
(45) Date of Patent: Nov. 7, 2023

(54) MACHINING TOOL

(71) Applicant: HONDA MOTOR CO., LTD., Tokyo (JP)

(72) Inventors: Junya Onose, Tokyo (JP); Mayumi Saruyama, Tokyo (JP); Yusaku Kotaki, Tokyo (JP); Akihiro Osawa, Tokyo (JP); Takayuki Konno, Tokyo (JP); Tomoya Kuroda, Tokyo (JP); Kyoko Tabata, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 48 days.

(21) Appl. No.: 17/681,962

(22) Filed: Feb. 28, 2022

(65) Prior Publication Data
US 2022/0314340 A1 Oct. 6, 2022

(30) Foreign Application Priority Data

Mar. 31, 2021 (JP) .................................. 2021-061401

(51) Int. Cl.
B23D 77/00 (2006.01)
B23B 51/00 (2006.01)

(52) U.S. Cl.
CPC ............ *B23D 77/00* (2013.01); *B23B 51/009* (2013.01); *B23D 77/006* (2013.01); *B23D 2277/04* (2013.01); *B23D 2277/203* (2013.01); *Y10T 408/906* (2015.01); *Y10T 408/9095* (2015.01)

(58) Field of Classification Search
CPC .. B23D 77/00; B23D 77/006; B23D 2277/04; B23D 2277/203; B23D 2277/26; B23D 2277/60; B23B 51/009; Y10T 408/906; Y10T 408/9095
See application file for complete search history.

(56) References Cited

U.S. PATENT DOCUMENTS

| | | | | |
|---|---|---|---|---|
| 2,063,753 A | * | 12/1936 | Pohlman | B23B 31/08 408/229 |
| 4,116,578 A | * | 9/1978 | Gelfand | B23B 51/08 408/222 |
| 5,282,705 A | * | 2/1994 | Shiga | B23D 77/00 408/229 |

(Continued)

FOREIGN PATENT DOCUMENTS

| | | | |
|---|---|---|---|
| CH | 433916 A | * | 4/1967 |
| CN | 105598531 A | * | 5/2016 |

(Continued)

OTHER PUBLICATIONS

Japanese Office Action for Japanese Patent Application No. 2021-061401 dated Mar. 22, 2023.

(Continued)

*Primary Examiner* — Eric A. Gates
(74) *Attorney, Agent, or Firm* — AMIN, TUROCY & WATSON, LLP

(57) ABSTRACT

A machining tool is a machining tool rotated about an axis and is provided with a machining blade portion having a rake face and a machining blade, wherein in a case where the rake face faces and is parallel to an virtual plane including the axis, the rake face is arranged at a position shifted from the virtual plane in the direction opposite to the rotational direction of the machining tool.

3 Claims, 3 Drawing Sheets

(56) References Cited

U.S. PATENT DOCUMENTS

| | | | |
|---|---|---|---|
| 6,213,692 B1 | 4/2001 | Guehring et al. | |
| 6,379,090 B1 | 4/2002 | Halley et al. | |
| 8,272,815 B2 * | 9/2012 | Takiguchi | B23C 3/055 |
| | | | 408/144 |
| 9,056,360 B2 * | 6/2015 | Ast | B23D 77/02 |
| 9,168,601 B2 * | 10/2015 | Ning | B23D 77/02 |
| 2015/0135905 A1 | 5/2015 | Maurer | |
| 2019/0232383 A1* | 8/2019 | Nakata | B23B 51/02 |
| 2020/0338649 A1 | 10/2020 | Wang et al. | |
| 2023/0147380 A1* | 5/2023 | Kawabata | B23B 51/00 |
| | | | 408/227 |

FOREIGN PATENT DOCUMENTS

| | | | | |
|---|---|---|---|---|
| CN | 209206484 | | 8/2019 | |
| DE | 102011117564 A1 * | | 5/2012 | B23D 77/02 |
| EP | 2745967 A1 * | | 6/2014 | B23B 41/12 |
| EP | 3228410 | | 10/2017 | |
| FR | 2020138 A1 * | | 7/1970 | |
| FR | 2516830 A1 * | | 5/1983 | |
| FR | 2690100 A1 * | | 10/1993 | B23B 51/00 |
| GB | 217182 A * | | 9/1924 | |
| JP | 61030317 A * | | 2/1986 | |
| JP | 07-048340 | | 11/1995 | |
| JP | 08-126904 | | 5/1996 | |
| JP | 11-502775 | | 3/1999 | |
| JP | 2003-305653 | | 10/2003 | |
| JP | 2012-161862 | | 8/2012 | |
| JP | 2016-041455 | | 3/2016 | |
| JP | 2017-042870 | | 3/2017 | |
| JP | 2018-164946 | | 10/2018 | |
| KR | 100427339 B1 * | | 4/2004 | |
| KR | 2012-0020911 | | 3/2012 | |
| WO | WO-9809758 A1 * | | 3/1998 | B23B 51/02 |
| WO | WO-2010102793 A1 * | | 9/2010 | B23B 31/1107 |
| WO | 2014/127105 | | 8/2014 | |

OTHER PUBLICATIONS

Japanese Office Action for Japanese Patent Application No. 2021-061401 dated Jan. 10, 2023.

Indian Office Action for Indian Patent Application No. 202244010177 dated Oct. 19, 2022.

* cited by examiner

MACHINING TOOL

CROSS-REFERENCE TO RELATED APPLICATIONS

This application is based upon and claims the benefit of priority from Japanese Patent Application No. 2021-061401 filed on Mar. 31, 2021, the contents of which are incorporated herein by reference.

BACKGROUND OF THE INVENTION

Field of the Invention

The present invention relates to a machining tool that is rotated and machines a workpiece.

Description of the Related Art

A workpiece is machined using a machining tool in order to produce various members. In this case, chips generated by machining the workpiece may remain in the workpiece (in the end, in the produced member). Chips remaining in the member may interfere with operations of the member. Therefore, generally, the machined workpiece is cleaned with a solvent to remove chips from the workpiece. However, depending on the shape of the chips, the chips may be caught inside the workpiece. In this case, even if the workpiece is cleaned, the chips are not easily removed from the workpiece.

For this reason, a machining tool has been developed in which the shape of chips is restricted to facilitate the removal of the chips. For example, JP H08-126904 A discloses a technology of a machining tool having many fine longitudinal grooves, ridges, or both. The machining tool bends chips in a spiral shape using the groove or the like. However, with this technique, it is difficult to control the length of the chips. The longer the chip length becomes, the harder it is to remove the chip from the workpiece.

SUMMARY OF THE INVENTION

Thus, it is a problem how to subdivide the chips at the machining tool. An object of the present invention is to solve the above-mentioned problems.

A machining tool according to one aspect of the present invention is a machining tool that is rotated about an axis and includes a machining blade portion having a rake face and a machining blade, wherein in a case where the rake face faces and is parallel to a virtual plane including the axis, the rake face is arranged at a position shifted from the virtual plane in a direction opposite to the rotational direction of the machining tool.

According to the present invention, it is possible to provide a machining tool in which chips are finely divided.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Hereinafter, a machining tool 10 according to an embodiment of the present invention will be described.

Figure 1:
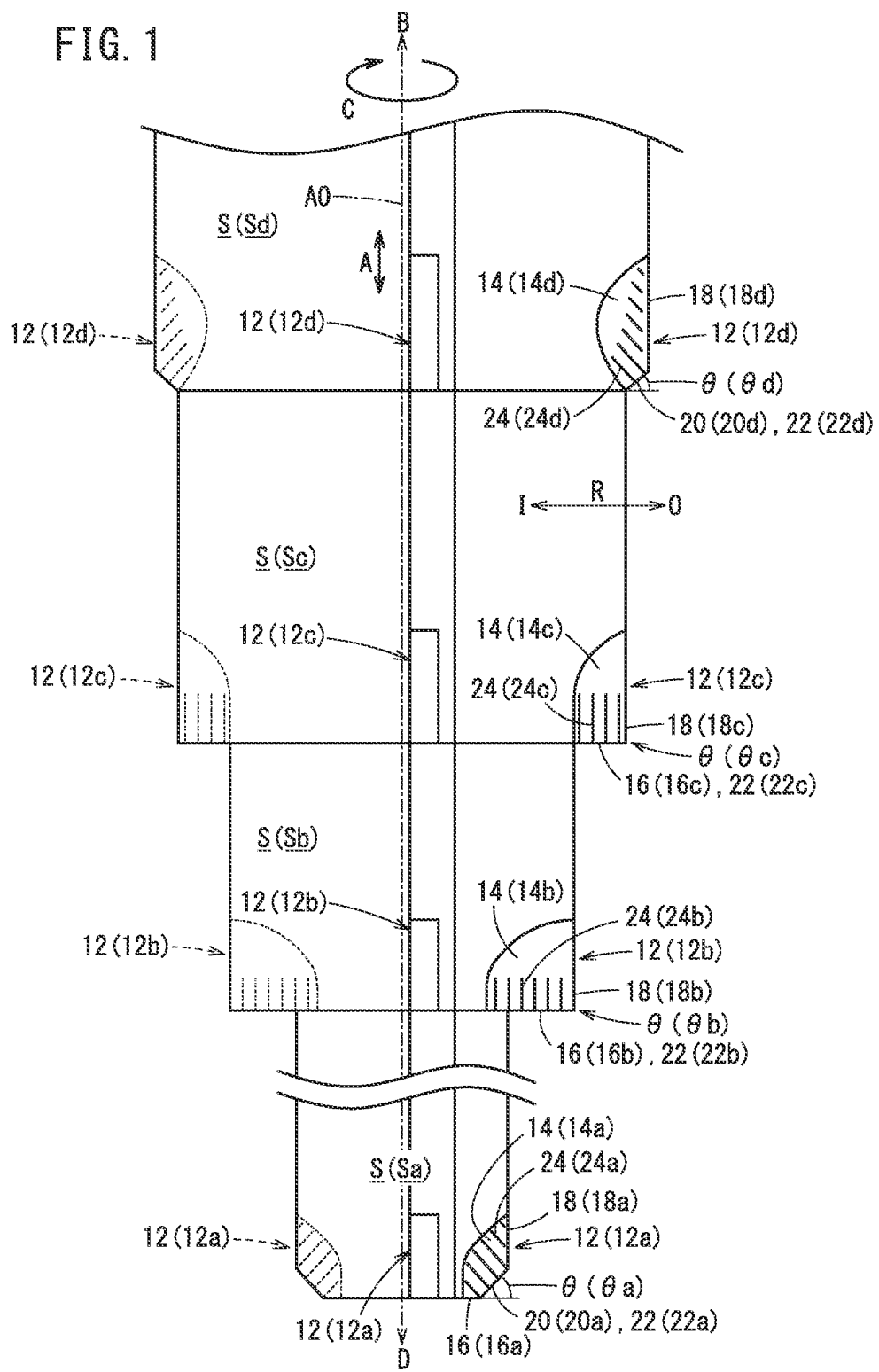
FIG. 1 is a view showing a machining tool according to an embodiment.

The machining tool 10 shown in FIG. 1 is, for example, a reamer. The machining tool 10 is provided with a plurality (here, four) of shaft portions S (Sa to Sd) and a plurality (here, four types and four for each type) of machining blade portions 12 (12a to 12d). The machining tool 10 machines a workpiece W while rotating about an axis A0. The machining tool 10 can enlarge a drill hole into four stages with four types of machining blade portions 12a to 12d.

The distal end direction D and the proximal end direction B of the machining tool 10 are respectively indicated by the up and down arrows in FIG. 1. A direction along the axis A0 is referred to as an axial direction A. The radial direction R of the machining tool 10 is a direction orthogonal to the axis A0. A radially outward direction O of the machining tool 10 is a radial direction R from the axis A0 toward the outer periphery of the machining tool 10. A radially inward direction I of the machining tool 10 is a radial direction R from the outer periphery of the machining tool 10 toward the axis A0.

The four shaft portions S (shaft portions Sa to Sd) are connected sequentially along the axis A0. Four machining blade portions 12 (12a-12d) are attached to each of the four shaft portions S at intervals on a circumference of a circle with the axis A0 at the center. That is, four machining blade portions 12a are attached to the shaft portion Sa. Similarly, four machining blade portions 12b are attached to the shaft portion Sb. Four machining blade portions 12c are attached to the shaft portion Sc. Further, four machining blade portions 12d are attached to the shaft portion Sd.

Each of the four machining blade portions 12a has a rake face 14a, a distal end face 16a, an outer peripheral end face 18a, an oblique end face 20a, a machining blade 22a, and a plurality of grooves 24a. Each of the machining blade portions 12a generates chips by machining the work W. The rake face 14a is a surface over which chips pass. The chips generated by the machining blade portion 12a pass over the rake face 14a and are then discharged to the outside of the machining tool 10. The distal end face 16a is an end face positioned in the distal end direction D of the rake face 14a. The outer peripheral end face 18a is an end face located in the radially outward direction O of the rake face 14a. The oblique end face 20a is an end surface formed between the distal end face 16a and the outer peripheral end face 18a.

The machining blade 22a is formed at the boundary between the rake face 14a and the oblique end face 20a. The plurality of grooves 24a are arranged in parallel with each other on the rake face 14a. Each of the plurality of grooves 24a has one end reaching the machining blade 22a. The plurality of grooves 24a are used for supplying lubricant to the machining blade 22a. The plurality of grooves 24a are inclined in the radially outward direction O with respect to the axial direction A toward the distal end direction D. As a result, the plurality of grooves 24a can more effectively supply the lubricant to the machining blade 22a under the centrifugal force generated by the rotation of the machining tool 10.

In this embodiment, the frictional resistance between the chip and the rake face 14a is reduced in the following manner. First, by providing a plurality of grooves 24a in the rake face 14a, the contact area between the chip and the rake face 14a is reduced. Thus, friction resistance is reduced. Further, the lubricant passing through the plurality of grooves 24a reaches the machining blade 22a. Thus, immediately after the chip is generated by the machining blade 22a, the lubricant reduces the frictional resistance between the chip and the rake face 14.

When the frictional resistance between the chip and the rake face 14a is reduced in this manner, the chip is curled and further cut as follows. First, since the frictional resistance between the chip and the rake face 14a is reduced, the chip can be easily separated from the rake face 14a. Therefore, a nascent surface of the chip is exposed to the atmosphere, and as a result, easily oxidizes. The oxidation of the nascent surface causes the chip to bend and thus curl. Further, as the oxidation of the chip progresses, the diameter of the curl of the chip decreases. As the diameter of the curl decreases, the stress in the chip increases. Then, when the internal stress of the chip reaches the fracture strength of the chip, the chip is divided. As described above, by reducing the frictional resistance between the chip and the rake face 14a, the chip is curled and finally divided.

Figure 2:
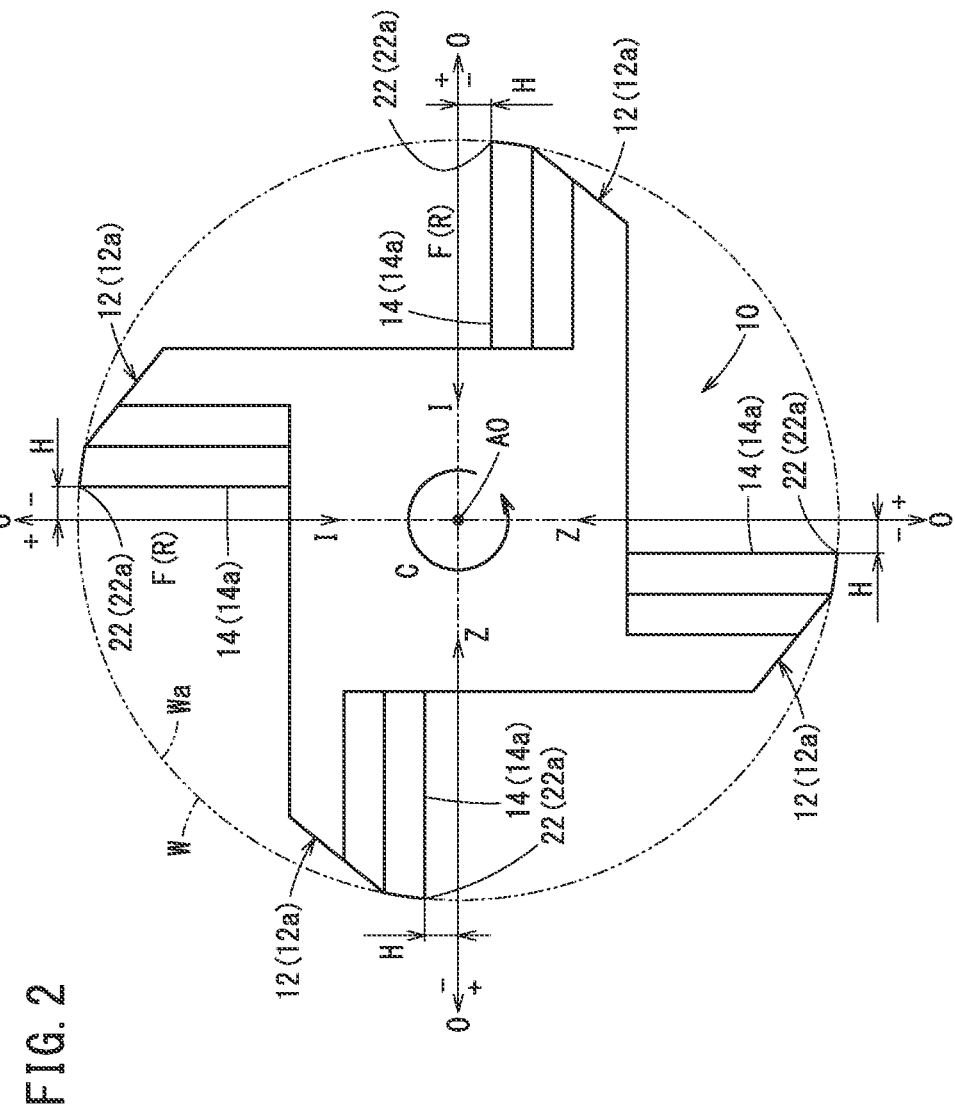
FIG. 2 is a view showing a tip of the machining tool as viewed in the axial direction.

FIG. 2 is a view showing the tip portion of the machining tool 10 as viewed in the axial direction. A virtual plane F including the axis A0 is set. Here, the rake face 14a is opposed to and parallel to the virtual plane F. The core height H of the machining blade 22a is defined with respect to the virtual plane F. The absolute value of the core height H is defined by the distance of the machining blade 22a (rake face 14a) from the virtual plane F. The positive and negative (plus and minus) sign of the core height H is defined by the position of the machining blade 22a with respect to the virtual plane F and the rotational direction C. When the machining blade 22a is located in the rotational direction C with respect to the virtual plane F, the core height H is positive (+). On the other hand, when the machining blade 22a is located in the direction opposite to the rotational direction C with respect to the virtual plane F, the core height H is negative (−).

As shown in FIG. 2, in the present embodiment, the rake face 14a is disposed at a position shifted from the virtual plane F in the direction opposite to the rotational direction C of the machining tool 10. That is, the core height H of the machining blade 22a is negative (−). This means that the machining blade 22a is in a so-called center height descending state. As will be described later, the core height H is preferably in a range from −0.1 mm to −0.7 mm, for example, in order to let the chips extend in the radially inward direction I. Further, the core height H is more preferably in a range from −0.2 mm to −0.5 mm.

Figure 3:
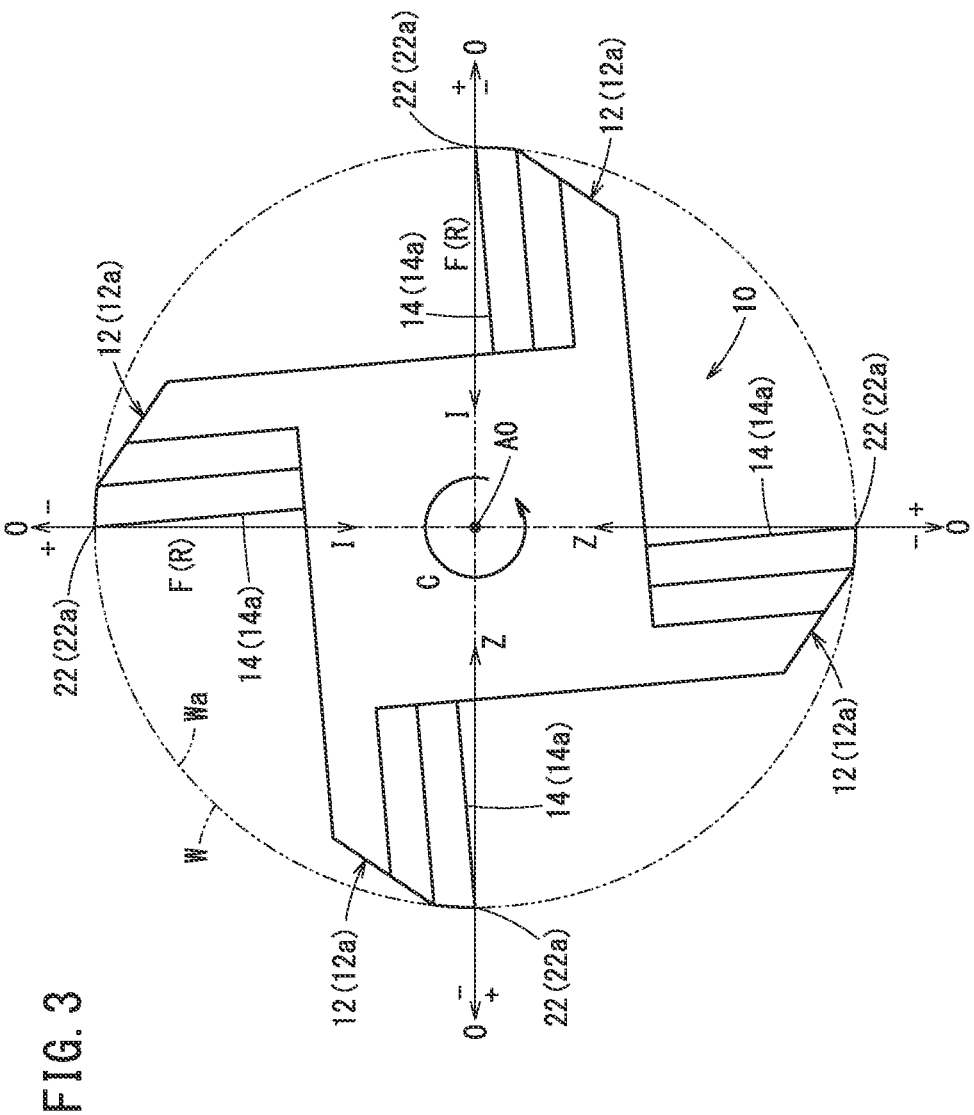
FIG. 3 is a view showing the tip of the machining tool as viewed in the axial direction.

FIG. 3 is a view showing the tip portion of the machining tool 10 as viewed in the axial direction. Here, the machining tool 10 rotates in the rotational direction C with respect to the virtual plane F until the outer side of the rake face 14a (the boundary between the rake face 14a and the outer peripheral end face 18a) comes into contact with the virtual plane F. In this case, the rake face 14a is inclined in the direction opposite to the rotational direction C toward the axis A0.

As described above, when the machining blade 22a is in the center height descending state, the chip generated by the machining blade 22 tends to extend in the radially inward direction I along the inclination of the rake face 14a during machining by the machining blade portions 12a. When the machining blade angle θa of the machining blade 22a shown in FIG. 1 is smaller than 60°, the tendency of the chips to extend in the radially inward direction I becomes stronger. The machining blade angle θa means an inclination (angle) of the machining blade 22a (oblique end face 20a) with respect to a plane perpendicular to the axis A0. The machining blade angle θa is preferably 45° or less.

As shown in FIGS. 2 and 3, by setting the machining blade 22a in the center height descending state (the state of having the negative core height H), the chips are easily broken and subdivided as shown below. First, as described above, the chip tends to extend in the radially inward direction I. If the chip continues to extend in the radially inward direction I, the chip can be broken by contacting the shaft S or the like. The chip may be cut off by contacting the inner wall Wa of a hole bored in the workpiece W. The tip of the chip that once extended in the radially inward direction I may change the direction and extend in the radially outward direction O. In this case, the chip contacts an inner wall Wa of the workpiece W and can be cut. In any case, in the present embodiment, the chips extend in the radially inward direction I at least once. Thus, by contacting the machining tool 10 or the workpiece W, the chips are subdivided.

On the other hand, as shown below, when the chips extend in the radially outward direction O, the chips tend to be elongated. In many cases, the chips are formed in the vicinity of the outermost periphery of the machining blade portion 12a. Therefore, when the generated chips extend in the radially outward direction O, it is difficult to make the chips contact the machining tool 10 and the workpiece W. In other words, the chips tend to be elongated.

In FIG. 1, the machining blade portions 12b to 12d also have a configuration corresponding to the machining blade portion 12a. That is, the machining blade portion 12b has a rake face 14b, a distal end face 16b, an outer peripheral end face 18b, a machining blade 22b, and a plurality of grooves 24b, and does not have the oblique end face 20. The machining blade 22b is formed at the boundary between the rake face 14b and the distal end face 16b. The machining blade angle θb of the machining blade 22b is 0. The plurality of grooves 24b are formed along the axial direction A. The machining blade portion 12c has a rake face 14c, a distal end face 16c, an outer peripheral end face 18c, a machining blade 22c, and a plurality of grooves 24c, and does not have the oblique end face 20. The machining blade 22c is formed at the boundary between the rake face 14c and the distal end face 16c. The machining blade angle θc of the machining blade 22c is 0. The machining blade portion 12d has a rake face 14d, an outer peripheral end face 18d, an oblique end face 20d, a machining blade 22d, and a plurality of grooves 24d. The machining blade 22d is formed at the boundary between the rake face 14d and the oblique end face 20d. In this embodiment, the machining blade angle θd is smaller than 45°.

Here, the machining blades 22b, 22c, and 22d are in the center height descending state as the machining blade 22a. Therefore, even in the case of the machining blades 22b, 22c, and 22d, the chips tend to extend in the radially inward direction I. That is, the chips tend to come into contact with the machining tool 10 or the workpiece W, and as a result, the chips tend to be broken and subdivided. Further, as described above, since the blade angles θb, θc, and θd are smaller than 45°, the chips coming from the machining blades 22b, 22c, and 22d have a stronger tendency to extend in the radially inward direction I.

As described above, in the present embodiment, when the rake face 14 faces the virtual plane F including the axis line A0 in parallel, the rake face 14 is disposed at a position shifted from the virtual plane F in the direction opposite to the rotational direction C of the machining tool 10. As a result, the chips tend to extend toward the radially inward direction I of the machining tool 10. As a result, the chips come into contact with the machining tool 10 or the inner wall Wa of the workpiece W, so that they are easily subdivided.

Modified Embodiment

The present invention is not limited to the above-described embodiments, and various configurations can be adopted without departing from the gist of the present invention. In the present embodiment, the number of each of the four kinds of machining blade portions 12a to 12d is set to 4, but the number may be set to 1 to 3 or 5 or more. The number of types of machining blade portions may also be 1 to 3 or 5 or more.

Invention Obtained from Embodiment

The invention that can be understood from each of the above embodiments will be described below.

[1] A machining tool (10) is a machining tool that is rotated about an axis (A0) and is provided with a machining blade portion (12) including a rake face (14) and a machining blade (22), wherein in a case where the rake face faces and is parallel to a virtual plane (F) including the axis, the rake face is arranged at a position shifted from the virtual plane in the direction opposite to the rotational direction of the machining tool. As a result, the chips generated by the machining blade easily extend along the rake face toward the radially inward direction (I) of the machining tool. As a result, the chips come into contact with the machining tool or the workpiece and are easily broken.

[2] The distance from the virtual plane to the rake face is 0.1 mm or more and 0.7 mm or less. The chips generated by the machining blade is more likely to extend along the rake face in the radially inward direction of the machining tool. As a result, the chips come into contact with the machining tool or the workpiece and are easily broken.

[3] The rake face includes one end reaching the machining blade, and a plurality of grooves are formed on the rake face so as to be arranged in parallel to supply lubricant to the machining blade. As a result, the contact resistance between the chips and the rake face is reduced, and the chips can be easily curled.

[4] A plurality of the machining blade portions are arranged along a circumference of a circle with the axis at the center. Thus, the workpiece can be machined by the plurality of machining blade portions.

What is claimed is:

1. A machining tool that is rotated about an axis, the machining tool comprising; a plurality of shaft portions that are provided at different positions in an axial direction; and a plurality of machining blade portions that each include a rake face and a machining blade and are provided to the plurality of shaft portions, respectively, the plurality of shaft portions comprise: a first shaft portion, a second shaft portion that is provided more toward a proximal end than the first shaft portion and has a larger diameter than the first shaft portion, a third shaft portion that is provided more toward the proximal end than the second shaft portion and has a larger diameter than the second shaft portion, and a fourth shaft portion that is provided more toward the proximal end than the third shaft portion and has a larger diameter than the third shaft portion, each rake face is a face formed parallel with the axis, a plurality of grooves that supplies lubricant to the machining blade are formed on each rake face, each of the plurality of grooves includes one end reaching the machining blade, and the plurality of grooves are arranged in parallel with each other, the plurality of grooves of the machining blade portions provided at the first shaft portion and the fourth shaft portion is inclined with respect to the axis, each of the machining blade portions provided at the first shaft portion and the fourth shaft portion include an oblique end face that is inclined with respect to a plane perpendicular to the axis, the plurality of grooves of the machining blade portions provided at the second shaft portion and the third shaft portion are formed parallel to the axis, the machining blades of the machining blade portions provided at the second shaft portion and the third shaft portion are parallel with the plane perpendicular to the axis, and wherein at each of the plurality of machining blade portions, in a case where the rake face faces and is parallel to a virtual plane including the axis, the rake face is arranged at a position deviated deviating from the virtual plane in a direction opposite to a rotational direction of the machining tool.

2. The machining tool according to claim 1, wherein a distance from the virtual plane to the rake face is 0.1 mm or more and 0.7 mm or less.

3. The machining tool according to claim 1, wherein the plurality of machining blade portions are arranged along a circumference of a circle with the axis at a center.

\* \* \* \* \*